Patented Aug. 3, 1937

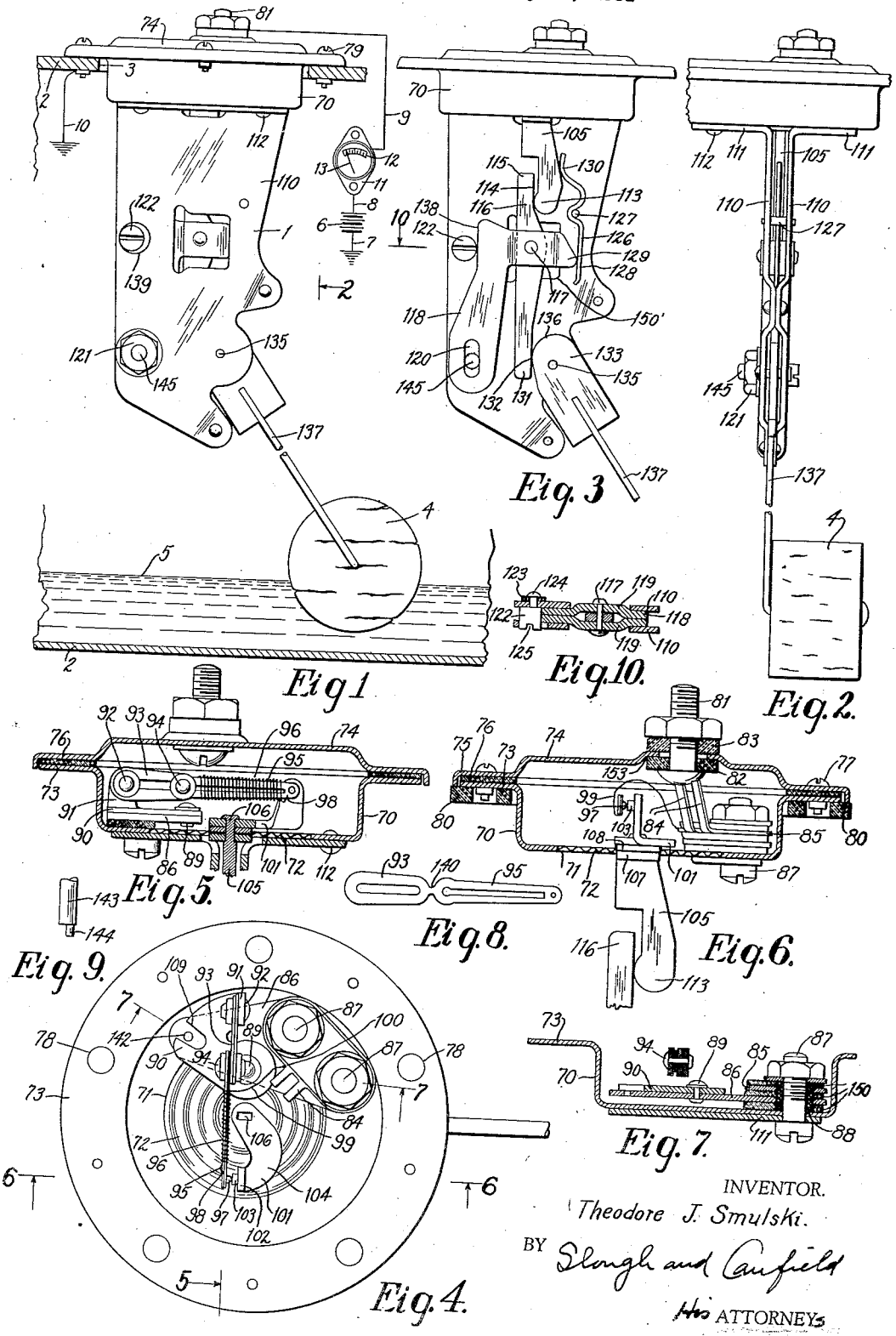

REISSUED
AUG -6 1940

2,088,819

UNITED STATES PATENT OFFICE 2,088,819

ACTUATOR FOR TELEMETRIC SYSTEMS

Theodore J. Smulski, Gary, Ind., assignor to The Anderson Company, Gary, Ind., a corporation of Indiana Original application May 18, 1931, Serial No. 538,152. Divided and this application December 14, 1933, Serial No. 702,341

4 Claims. (Cl. 200—84)

This invention relates to indicating instruments of the class in which an indicating receiver portion of the instrument, or indicator, is electrically actuated by a remotely disposed actuating portion of the instrument, or actuator, the two portions of the instrument being interconnected by a suitable electric circuit.

My invention relates more particularly to instruments of this class in which the indicator is adapted to respond to current impulses transmitted thereto over the electric circuit by an impulse-sending actuator.

The instant invention, therefore, relates more particularly to actuators of this class for transmitting electric impulses variably in response to the variations of a variable factor. Such actuators may be caused to respond to any variable factor but herein the actuator of my invention is illustrated and described as responding to movements of a movable element through a range of movement, and more particularly to the movements of a float in a liquid tank whereby the indicator may be caused to indicate the level of liquid in the tank.

It is one of the objects of this invention to provide an improved construction of actuator of the type referred to adapted to transmit to a receiving instrument a succession of electric impulses.

Another object is to provide such an actuator having improved means for adjusting the same to compensate for variations in the manufacture and assembly of the parts thereof.

Another object is to provide such an actuator of the thermo-responsive type and having improved means for compensating for changes of ambient temperature.

Another object is to provide such an actuator adapted to be injected into a tank containing liquid and provided with improved means for sealing the tank against egress of liquid therefrom at the point of injection.

Another object is to provide, in an actuator of the class referred to adapted to transmit current to a remotely disposed indicating instrument having a movable indicating element, improved means for adjustably varying the transmitted current to adjust the position of the indicator movable element for any given quantity of the variable factor to which the actuator is responsive.

Another object is to provide, in an actuator of the class referred to, adapted to transmit current to a remotely disposed indicator comprising a movable indicating element and a scale, improved means whereby the actuator may be adjusted to adjust the indicating element to the extremities of its indicating scale, in accordance with preselected extreme values of the variable factor to which the actuator is responsive.

Another object is to provide an actuator of the class referred to provided with adjustment means for adjustably varying the current transmitted thereby to the indicator, whereby an indicating element of the indicator may be adjusted to either of the extremes of an indicating scale thereof and each independently of the other.

Another object is to provide an improved actuator of the type adapted to transmit current impulses over an electric circuit.

Another object is to provide an actuator of the type adapted to transmit current impulses over an electric circuit and to vary the said impulses in response to variations of a variable factor, and having improved means to cause the impulses to vary in response to variations of the variable factor.

Another object is to provide an actuator of the class referred to comprising a pair of electric contacts and a thermostatic means for engaging and disengaging the contacts, and having improved means for aligning the contacts with each other and for adjusting their relative positions to a predetermined temperature.

Another object is to provide, in an actuator of the class referred to comprising a pair of contacts, movable relative to each other to effect transmission of impulses over an electric circuit, an improved means for adjusting the normal relative position of the contacts.

Another object is to provide, in an electric controller, comprising a pair of relatively movable contacts, an improved mechanism whereby the contacts may be adjusted positionally relative to each other by an adjusting tool.

Another object is to provide, in an electric controller comprising a pair of contacts movable to engage and disengage each other, an improved supporting means for the contacts whereby they may normally maintain any adjusted position and whereby they may in an improved manner be adjustably moved to vary their normal position.

Other objects will be apparent to those skilled in the art to which my invention appertains.

My invention is fully disclosed in the following description taken in connection with the accompanying drawing, in which:

Fig. 1 illustrates, in front elevational view and to an enlarged scale, a transmitter instrument or actuator embodying my invention, the view showing also a part of a liquid containing tank upon which the actuator is mounted;

Fig. 2 is a view of the actuator of Fig. 1 taken approximately from the plane 2 of Fig. 1;

Fig. 3 is a view similar to Fig. 1 but with one of the frame elements thereof omitted to show interior mechanism thereof;

Fig. 4 is a top plan view of the actuator of Fig. 1 drawn to a still larger scale and with a cover thereof removed to show inside mechanism thereof;

Fig. 5 is a cross-sectional view taken approximately from the plane 5 of Fig. 4 and with the said removed cover of Fig. 4 in place;

Fig. 6 is a view similar to Fig. 5 taken from the plane 6 of Fig. 4.

Fig. 7 is a fragmentary cross-sectional view taken from the plane 7 of Fig. 4;

Fig. 8 is a view of a pair of bimetallic elements which I may employ and illustrating a step in the method of making the same;

Fig. 9 is a fragmentary view of an adjusting tool which I may employ in connection with the mechanism shown in Fig. 4;

Fig. 10 is a sectional view taken from the plane 10 of Fig. 3.

Referring to the drawing, Fig. 1, I have shown at 1 an actuator or actuating portion of the instrument of my invention projected into a tank 2 through a suitable perforation 3 in the wall thereof and provided with a float 4 adapted to assume different positions of elevation in correspondence with changes of level of liquid 5 in the tank. The actuator 1 comprises improved means for sealing the aperture 3 and comprises means for transmitting over an electric circuit, comprising a battery 6, a ground connection 7 for the battery, a circuit wire 8, circuit wire 9 and a ground circuit 10 for the actuator, electric impulses varying in duration in accordance with variations of liquid level in the tank, the electric impulses energizing and actuating an indicating instrument 11 to indicate on a scale 12 thereof by means of a moving needle 13 the level of the liquid 5 in the tank 2.

The instrument 11 may be any suitable electro-responsive instrument, which upon the reception of a succession of current impulses will effect indication upon a scale. The instrument which I prefer to employ is that illustrated and described in U. S. Patent 2,022,441 issued November 26, 1935, for improvements in Electrical indicating instruments, from which the instant application is divisional, and reference may be had thereto for a more complete description of such an instrument.

The mechanism of the actuator 1 and which will presently be more fully described, is enclosed generally or housed in a casing comprising a shallow cup-form housing 70 the bottom of which is provided with a large perforation 71 in which is sealedly inserted as for example by soldering, a diaphragm 72 constructed from sheet metal and formed of a plurality of concentric corrugations to render the same flexible for a purpose to be described. The open end of the cup is provided with a laterally extending annular flange 73. A cover 74 formed preferably from sheet metal is slightly cupped or dished and has a laterally extending annular flange 75 substantially coextensive with and parallel to the flange 73. The cover and housing 74 and 70 are sealedly joined together to provide a sealed chamber therewithin by a packing washer 76 disposed between the flanges 73 and 75 and by a plurality of screws or bolts 77 clamping the flanges together. The flanges 75 and 73 are also provided with a plurality of aligned perforations 78—78 through which bolts may be projected to secure the actuator as a whole to the wall of a tank such as the wall 2, Fig. 1, through which the actuator is projected. In Fig. 1 such bolts are shown at 79—79 and a packing or sealing washer 80 is disposed on the outer surface of the tank and between the tank and the said joined flanges 75 and 73.

A terminal bolt 81 is projected through an enlarged clearance perforation in the cover 74 and is insulated therefrom by washers 82 and 83 on opposite sides of the cover. The washer 82 is seated in a recess 153 in the inner side of the cover which fits the outer periphery of the washer to prevent lateral shifting of the washer and to hold the bolt in the center of the perforations to insulate it from the cover. When the cover 74 is put in place, the head of the bolt 81 is disposed in resilient engagement with a pair of resilient prongs 84—84 formed on and bent upwardly from a plate 85.

The plate 85 and a sub-base 86 are rigidly secured to the housing 70 by a pair of bolts 87—87 which not only clamps them on the housing but prevents rotational shifting thereof. The plate 85 and sub-base 86 are insulated completely by suitable insulating washers 150—150 and by insulating bushings 88 enclosing the bolts 87.

The sub-base 86 extends laterally from the bolts 87 and in an intermediate portion has riveted thereto as at 89 an adjustable support 90 formed from a piece of sheet metal and provided with an upstanding lug 91.

Riveted to the lug 91 as at 92 is a bimetal compensating element 93 in the form of a link, one end of which is looped around the rivet 92. At the other end of the element 93 it is linked or looped around another rivet 94, which rivet is also projected through a second link-form bimetallic element 95, which will hereinafter be referred to as a contacting element. The elements 93 and 95 are disposed in a vertical plane. Preferably the rivet 94 is riveted tighter than the rivet 92, so that the two elements, joined at 94 may be hingedly or longitudinally adjustably moved around or upon the rivet 92 to adjustably position the outer end of the element 95, and the two elements may be maintained in longitudinal alignment, by adjustment around the rivet 94 is necessary.

The elements 93 and 95 are of link-form, that is, they have longitudinally elongated perforations therein for the following purpose. As is well known, bimetal in planular or sheet form tends to warp convexly on one side and concavely on the other, and if an element of considerable width such as the element 93 is employed, the tendency to warp concavely transversely would tend to add stiffness to the element to prevent its free bending longitudinally, but by providing the longitudinal slot therein the transverse dimension is made relatively small and any tendency to bend in that direction is overcome by the greater tendency to bend in the longitudinal direction.

The longitudinal perforation of the element 95 serves this same purpose and an additional purpose. In devices of this class, in which an element such as the element 95 is to respond to temperature applied thereto by an electric winding, such as the winding 96 to be referred to, it is desirable that the actual mass of metal be limited to a predetermined amount in order that it may properly radiate heat. But in some instances the desired mass of material may not provide a suitable support for a sufficient length of winding wrapped thereon. By constructing the element 95 with the longitudinal perforation therein, the length of winding 96 which it will take may be increased to any desired amount within reasonable limits, and the mass of the element determined by the size of the perforation.

The outer or free end of the element 95 is provided with an electric contact 97. The element 95 is also provided with a heating winding wrapped thereon in the form of an insulated wire 96, one end of which is grounded on the element 95 as at 98, the other end of which is connected by a wire 99 to the plate 85 as at 100.

A contact support 101 formed from sheet metal has an upstanding lug 102 carrying a contact 103 engageable by the contact 97 and the contact support 101 has a portion 104 disposed substantially parallel to the diaphragm 72, and at the center of the diaphragm is riveted to an axially downwardly projecting arm 105 on the outside of the housing 70, the riveted connection being effected by projecting a reduced portion 106 of the arm 105 through a perforation in the diaphragm 72 and through a perforation in the contact support 101, and riveting over the inner end of the reduced portion 106, washers 107 and 108 being disposed on each side of the diaphragm 72 if desired. The support 101 and arm 105 are thus rigidly connected to the diaphragm 72 and any movement communicated to the arm 105 from the outside, such for example as moving it toward the right or toward the left as viewed in Fig. 6, will move the contact 103 toward or from the contact 97.

The rivet 89 is disposed generally directly under the aligned elements 93 and 95 and intermediate their opposite ends and the rivet is drawn tight enough to prevent accidental shifting of the support 90 on the sub-base 86, but the support may be adjustably shifted to rock the plate 90 on the rivet 89 as a bearing, and to correspondingly adjust the position of the contact 97 rotatably around the rivet 89, that is, toward and from the contact 103 as will be understood.

To adjustably move the plate 90, the following means is provided. A notch 109 having generally parallel sides is provided in the support 90; and in the sub-base 86, generally aligned with the notch 109 is a perforation 142. A tool such as indicated in Fig. 9 is provided having a body or shank 143 generally of a diameter slightly less than the width of the notch 109 and has projecting from the end thereof an eccentrically disposed stub bearing 144. The bearing 144 may be inserted in the perforation 142 and the body 143 when rotated will act as a cam on the walls of the notch 109 to adjustably rotate the support 90.

The adjustment just described is made during the manufacture of the actuator to compensate for variations in the form and assembling of the parts and will dispose the contacts 97 and 103 in what may be called normal relative positions. To align the contacts 103 and 97, the element 95 may be raised and lowered or shifted longitudinally with the hinging or sliding movements described above.

The general operation of my invention electrically considered will now be described. Current may flow from the battery 6, Fig. 1, by wire 7 to ground and thence by wire 10 to tank 2, housing 70, Figs. 4, 5 and 6, contact 103, contact 97, heating winding 96, plate 85 to external terminal bolt 81. Thence the current may flow by wire 9 to the instrument 11 of Fig. 1 and thence by wire 8 to the battery 6.

Heat developed in the winding 96 will bend the contacting element 95 to break contact at 97—103 whereupon flow of current stops, and the element 95 cools off, and returns the contact 97 into engagement with the contact 103. Thus the contacts 97—103 are repeatedly opened and closed causing impulses of current to flow over the circuit described. The impulses of current actuate the instrument 11 to cause the needle 13 thereof to take up a definite corresponding position on the scale 12 of the instrument.

If the impulses are relatively short in duration, the needle 13 will indicate a point not far from zero and vice versa if the impulses are of longer duration. This results from the inherent characteristics of the receiving instrument which forms no essential part of the instant invention and may be better understood from the reference to the above-mentioned patent.

The duration of the impulses may be varied by moving the contact 103 to different positions and this in the apparatus of my invention is effected by movement of the support 101 by means of the arm 105 disposed below the diaphragm 72, and means which will now be described is provided to move the arm 105 correspondingly with changes of level of liquid 5 in the tank 2 to cause the needle 13 of the instrument to indicate on the scale the amount of liquid in the tank.

A pair of side plates 110—110 are disposed substantially parallel to each other slightly spaced apart, depending from the housing 70, being supported on the housing by laterally extending feet 111—111 riveted to the bottom of the housing 70 as at 112 and/or bolted thereto by the bolts 87—87.

The side plates 110 form supports for a number of mechanism elements pivoted therebetween and enclose said parts to protect them from accidental displacement or injury. The arm 105 above described extends downwardly between the plates, Figs. 2 and 3. On its lower end it is provided with a rearwardly extending, rounded projection 113 engaging a vertically or longitudinally disposed face 114 on the short arm 115 of a pivoted lever 116. The lever 116 is pivoted as at 117 to a pair of superimposed preferably identical adjusting elements 118—118, generally of inverted L shape, and formed from flat sheet metal. As shown in Fig. 10, the horizontal legs of the L are spread apart to provide two spaced portions 119—119 between which the lever 116 is disposed and to which it is rotatably pivoted by the rivet 117 extending through the lever and through the portions 119. In the vertical leg of the L, a vertically elongated slot 120 is provided through which the shank of a bolt 145 is projected, the nut 121 of the bolt when drawn up tight clamping the side plates 110—110 together to cause them to seize and grip the elements 118—118 and thus clamp them immovably. On loosening the nut 121, the plates 118 may, together as a unit, be moved longitudinally adjustably by means of the slot 120 to vary the vertical position of the lever 116.

The heel of the L abuts rearwardly upon the head 122 of a rivet having a shank portion 123 eccentric with respect to the head 122 projected through a perforation in one of the side plates 110 and riveted over as at 124. A screwdriver slot 125 is provided in the head 122 for turning it. The head 122 may thus be operated as a cam upon rotating it to rock the elements 118 around the bolt 145 and move the pivot 117 adjustably forwardly and rearwardly. A spring 126 preferably formed from resilient wire is looped over a post 127 between the side plates 110 and has one end 128 in engagement with a nose 129 on the elements 118, and at its opposite end as at 130 engages the forward side of the arm 105. The projection 113 is thus maintained always in pressure-contact with the face 114 and the elements 118 are held in pressure-contact with the screw head 122.

The lever 116 has a relatively long arm 131 below the pivot 117 provided with a contact face 132 preferably disposed substantially in a plane with the face 114. A cam head 133 formed from relatively thick sheet metal is rotatably or oscillatably mounted on a pivot 135 supported by the side plates 110 and has an eccentric camming face 136 engaging the face 132 of the lever. The cam head 133 extends outwardly forwardly from the side plates and is provided with an extension 137 preferably formed from a wire secured at one end to the cam head and at its opposite end carrying a float 4 of cork or the like.

When the actuator thus constructed is installed as in Fig. 1, the float 4 will rise or fall with changes of liquid level and by means of the cam face 136 will correspondingly oscillate the lever 116, causing it to take up positions corresponding to the positions of the float, and for each position of the lever 116, the arm 105 will move the contact 103 to a corresponding position, the movement of the arm being communicated to the contact support 101 by the yielding movement of the diaphragm 72 to which these parts are rigidly attached.

The purpose of the adjustable movements of the elements 118 above described will now be explained. When the apparatus is installed as in Fig. 1, and when the float is in its lowermost position, that is with the parts in the position of Fig. 3, the corresponding position of the contact 103 may be such as to cause it to engage the contact 97 whereupon current impulses will flow and therefore the needle 13 may be moved from the zero position on the scale. Also, when the float is in its uppermost position, in which condition the contact 103 will occupy its farthest position toward the contact 97, the impulses of maximum duration which correspondingly flow may or may not cause the needle 41 to take up a position exactly on the "full" position of the dial. Also, if the actuator should properly control the impulses to correctly indicate zero and "full" for one installation, it might not properly indicate for another or similar installation due to differences in the size and/or shape of the tank 2.

It is one of the important features of my invention that the position of the needle 13 with respect to the scale 54 may be adjusted by adjustments at the actuator and that the said adjustments may be changed at will by manipulations made externally of the actuator and without the necessity of opening it up to get at the mechanism therein.

Referring to Fig. 3, and with the float in the lowermost position as indicated in that figure, the lever 116 will be in its extreme counter-clockwise position, and therefore the arm 105 will be at its farthest position toward the left, Figs. 3 and 6, and the contact 103 at its farthest position toward the right, Figs. 6 and 4. Now, by turning the screw head 122, first loosening slightly the nut 121 if necessary to take off the clamping pressure of the side plates 110 on the elements 118, the pivot 117 may be adjustably moved forwardly and rearwardly until the contact 103 is at exactly the correct position to permit the needle 41 to rest on the zero position. This adjustment will be retained by the frictional mounting of the screw head 122 by the riveted over end 124.

The cam head 133 may now be rocked to its extreme upper position causing the cam face 136 to rock the lever 116 to its extreme clockwise position, correspondingly moving the contact 103 to the position to produce impulses of maximum duration. If the needle 13 then comes to rest off of the "full" position, the adjusting elements 118 may be moved longitudinally by means to be described, and by carrying the lever 116 with them, the relative lengths of the lever arms 115 and 131 are changed. By moving the lever 116 downwardly as viewed in Fig. 3, the arm 115 is made relatively longer and the arm 131 relatively shorter. This will have the effect of increasing the movement of the arm 105 and correspondingly moving the contact 103 farther to the left, Figs. 4 and 6, and increasing the duration of the impulses to cause the needle 13 to take up a position nearer the "full" position. In this manner the needle may be caused to take up exactly the "full" position desired.

The described longitudinal movement of the elements 118 is guided by the slot 120. In the preferred construction, the spaced portions 119—119 are disposed in perforations 150—150 in the plates 110—110; and to adjustably move the elements 118, a screw-driver may be inserted in a perforation 150 and between the upper, or lower, edge of the perforation and the horizontal leg of the element 118 to pry the leg downwardly, or upwardly, respectively.

It will be observed that the faces 114 and 132 of the lever 116 are parallel to the face 138 on the adjusting elements 118, which face engages the screw head 122, so that the longitudinal adjusting movement of the lever 116 does not change its relative transverse position and does not change the adjustment which previously had been effected by rotation of the screw head 122. Thus the adjustment of the needle at the full end of the scale does not change the adjustment at the zero end. After the nut 121 has been again clamped tight, the adjustment is fixed thereby.

These two adjustments just described may be effected from the outside of the actuator, the nut 121 being freely accessible and the screw head 122 likewise being freely accessible, a perforation 139 in the side plates being provided for that purpose.

The movements of the contacting element 95 are compensated to neutralize the effect of local or ambient temperature, by means of the compensating element 93. Referring to Fig. 4, any tendency of the element 95 to bend toward the left due to ambient temperature is compensated for by the element 93 tending to bend toward the right around the rigid riveted connection 92.

For this purpose it is desirable that the two elements 93 and 95 be formed from sheet metal of the same thickness and that in riveting them together as at 94, one be turned oppositely to the other with respect to the two different kinds of metal of which they are composed. To insure that the two elements will be of substantially the same thickness in every case so that the compensating action may be predetermined, I employ the following process in the manufacture of elements 93 and 95.

These two elements are stamped from sheet bimetal in a single piece as illustrated in Fig. 8, the portion which is to be the element 93 joined to the portion which is to be the element 95 by a thin connecting web 140. This integral structure is retained until at the very moment of riveting the portions together as at 94. At that moment, the two parts are broken apart by severing the web 140, one of the elements is turned upside down and then the two riveted together. By retaining the parts 93 and 95 joined together until the moment of assembly, they are kept in pairs, each pair coming from substantially the same spot in the sheet of bimetal and therefore being of substantially the same thickness in spite of variations in thickness of the sheet of bimetal which may occur from point to point therein.

As an alternative means to compensate for changes of ambient temperature and the effects thereof upon the bimetallic element carrying the contact 97, the following means may be employed. The winding 96 on the bimetallic element may be made from wire having a positive temperature coefficient. Then upon a change of ambient temperature, for example a rise of ambient temperature, which would tend to supplement the heat of the winding 96, the temperature of the winding will be correspondingly increased and will increase its resistance resulting in a diminution of current flowing therethrough and in a diminution of the heating effects thereof. Thus a rise of ambient temperature is met by a decrease of heating current. By proportioning the size and length of the heating wire 96 to the dimensions of the bimetallic element, the compensation may be effected in this manner over a wide range of ambient temperature.

In such cases it may be desirable to entirely omit the compensating bimetallic element 93.

My invention is not limited to the exact details of construction shown and described. Many changes and modifications may be made within the scope and spirit of my invention and without sacrificing its advantages.

I claim:

1. In an electric controller, a main support, an auxiliary support insulated from the main support and adjustable relative thereto, the main support comprising a flexible portion movable responsive to variations of liquid level, a first contact secured to said flexible portion and movable therewith, and a thermostatic element rigidly mounted on the auxiliary support by an end thereof and at its opposite end having a second contact movable toward and from the first contact under thermal change whereby the contacts will be intermittently engaged and the aggregate time of engagement in a given interval will be in correspondence with a given position of the first contact.

2. In an electric controller, a main support adapted to engage the top portion of a liquid container, an auxiliary support insulated from the main support, the main support comprising a flexible portion, a first contact element secured to the flexible portion including an arm depending from and a contact portion disposed above the flexible portion, a second contact including a thermostatic element rigidly secured to the auxiliary support at one end and having a second contact at its opposite end, the second contact being movable toward and from the first contact under thermal change, means engageable with said depending arm for rocking the first contact in correspondence with liquid level whereby the aggregate time during which the contacts are intermittently engaged in a given interval due to thermal change will be determined by the position of the first contact, and the auxiliary support being movable to move the second contact towards and from the first contact.

3. In an electric controller, a main support, an auxiliary support insulated from the main support and adjustable relative thereto, the main support comprising a flexible portion, a first contact element secured to the flexible portion and including a depending arm and an upstanding contact, means engageable with said arm to rock the contact responsive to variations in liquid level, a thermostatic element rigidly secured by an end to the adjustable support and at its opposite end having a second contact movable toward and from the first contact under thermal change whereby the contacts will be intermittently engaged, the aggregate time of engagement of the contacts in a given interval being determined by the position of the first contact, and the auxiliary support being adjustable to effect bodily movement of the thermostatic element and contact to relatively adjust the contact for a given position of the depending arm.

4. In an electric controller, a main support, an auxiliary support insulated from the main support and adjustable relative thereto, the main support comprising a flexible portion movable responsive to variations of liquid level, a first contact secured to said flexible portion and movable therewith, a thermostatic element rigidly mounted on the auxiliary support by an end thereof and at its opposite end having a second contact movable toward and from the first contact under thermal change whereby the contacts will be intermittently engaged and the aggregate time of engagement at a given interval will be in correspondence with a given position of the first contact, and the thermostatic element having portions of its length adapted to bend in opposite direction longitudinally responsive to thermal change whereby the position of the second contact will be relatively unaffected by variation in ambient temperature.

THEODORE J. SMULSKI.